United States Patent
Hayzen et al.

(10) Patent No.: US 11,009,520 B2
(45) Date of Patent: May 18, 2021

(54) DETERMINATION OF MACHINE ROTATIONAL SPEED BASED ON VIBRATION SPECTRAL PLOTS

(71) Applicant: Computational Systems, Inc., Knoxville, TN (US)

(72) Inventors: Anthony J. Hayzen, Knoxville, TN (US); Stewart V. Bowers, III, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 303 days.

(21) Appl. No.: 16/269,156

(22) Filed: Feb. 6, 2019

(65) Prior Publication Data

US 2019/0310281 A1  Oct. 10, 2019

Related U.S. Application Data

(63) Continuation-in-part of application No. 15/946,403, filed on Apr. 5, 2018, now Pat. No. 10,823,749.

(51) Int. Cl.
*G01P 3/489* (2006.01)
*G01H 1/00* (2006.01)
*G01P 1/12* (2006.01)

(52) U.S. Cl.
CPC ............ *G01P 3/489* (2013.01); *G01H 1/003* (2013.01); *G01P 1/122* (2013.01)

(58) Field of Classification Search
CPC ...... G01H 1/003; G01M 13/028; G01M 7/02; G01N 29/12; G01N 29/14; G01N 29/46
See application file for complete search history.

(56) References Cited

U.S. PATENT DOCUMENTS

| | | | | |
|---|---|---|---|---|
| 5,530,343 A * | 6/1996 | Bowers, III | ............. | G01P 3/48 324/160 |
| 5,744,723 A * | 4/1998 | Piety | ......................... | G01P 3/44 702/145 |
| 6,766,288 B1 * | 7/2004 | Smith | .................... | G10H 1/383 704/207 |
| 6,792,360 B2 * | 9/2004 | Smulders | ............... | G01H 1/003 702/35 |
| 10,168,248 B1 * | 1/2019 | Morey | ................ | G01M 13/045 |
| 2007/0032966 A1 * | 2/2007 | Song | .................. | G05B 23/0243 702/35 |

* cited by examiner

*Primary Examiner* — Kyle R Quigley
(74) *Attorney, Agent, or Firm* — Luedeka Neely Group, P.C.

(57) ABSTRACT

An apparatus is described that determines an estimated rotational speed of a rotating component of a machine in the absence of a reliable tachometer signal to indicate an actual rotational speed. The apparatus includes a processor that produces a spectral plot of the vibrational data, locates peaks in the spectral plot, and scans the spectral plot in predetermined rotational speed increments to provide candidate rotational speeds. For each candidate rotational speed, associated harmonics are identified, closest peaks in the spectral plot to the candidate rotational speed and its harmonics are located, gaps between the closest peaks and the candidate rotational speed and its harmonics are measured, and a sum of the gaps is recorded. The estimated rotational speed is the candidate rotational speed associated with a minimum sum of the gaps.

14 Claims, 9 Drawing Sheets

DETERMINATION OF MACHINE ROTATIONAL SPEED BASED ON VIBRATION SPECTRAL PLOTS

RELATED APPLICATIONS

This application claims priority as a continuation-in-part of U.S. patent application Ser. No. 15/946,403, titled "Determination of RPM from Vibration Spectral Plots," filed Apr. 5, 2018.

TECHNICAL FIELD

The disclosure relates to an apparatus for determining the rotational speed of a machine, and more particularly to analytical instruments for determining rotational speed using vibration analysis in the absence of actual rotatational speed measurements.

BACKGROUND OF THE INVENTION

Rotating equipment, such as fans, motors, turbines, and the like, tend to lose their balance or alignment with time due to conditions such as wear, varying load, damage, misuse, and foreign matter accumulation. As balance and alignment are lost, the equipment produces excessive vibration, which if left uncorrected, causes accelerated wear and other damage to the equipment.

Vibration analyzers detect and analyze the vibration emitted from rotating equipment. Such analyzers determine the source of the vibration, whether it be unbalance, misalignment, worn bearings, missing or broken parts, or some other problem. To make a proper diagnosis of the vibration problem, the rotational speed of the shaft must be known. However, the rotational speed is not often known at the time of data collection. In such cases, the rotational speed must be calculated from the vibration spectrum.

Correlation of the rotational speed of the shaft in the vibration spectrum is required for problem diagnosis because there are often many different potential sources of vibration, each of which creates a different vibration signature. One of the first determinations to be made is whether the vibration detected is synchronous or asynchronous with the rotation of the equipment. If asynchronous, an analysis is made to determine whether the vibration can be correlated in some other way to the rotational speed of the equipment. In this manner, specific problems are isolated and corrected.

For example, in a piece of rotary equipment such as a turbine, vibration that is synchronous with the first harmonic of the rotational speed indicates rotor unbalance, for which there are well defined methods of correction. Knowing the rotational speed of the turbine allows for a speedy diagnosis of this problem, and reduces time wasted on investigation of unrelated potential vibration sources.

As another example, a defective anti-friction bearing produces vibration that has a fixed, but non-integer relationship to the speed of the shaft. Thus the vibration is not a harmonic of the rotational speed of shaft. However, with a knowledge of the bearing parameters, such as the inner and outer race fault frequencies, the vibration produced by the defective bearing is correlated with the speed of the shaft, and the problem is diagnosed and corrected. Again, without knowledge of the speed of the shaft, the defective bearing is more difficult to diagnose.

Further, in a piece of rotary equipment such as a gear box, which may have several gears of different sizes, a problem such as a cracked tooth on one of the gears creates vibration that is synchronous with the rotational speed of a shaft. Correlating the speed of rotation, the known number of teeth on each gear, and the vibration spectrum allows the damaged gear to be diagnosed.

In each case, the diagnosis of the source of vibration is made easier if the rotational speed of the equipment is known. The actual correlation of the rotational speed to the vibration spectrum, and the analysis of the correlated information, is performed either by the technician, or automatically by the vibration detection instrument, if it has such capability.

The problem is that without use of a tachometer to measure the rotational speed, it is difficult to determine the rotational speed accurately. In many cases, the rotational speed is either assumed to be the default assigned when the machine was configured or it is manually entered based on data collected using a portable analyzer. In such situations, the rotational speed is an approximation at best. As the load on the machine varies, the actual rotational speed may also vary. Thus, the assumed rotational speed may be completely incorrect due to manual data entry errors. What is needed, therefore, is an apparatus that can be used to determine the rotational speed of a machine when a tachometer and actual rotational speed data are unavailable.

SUMMARY OF THE INVENTION

U.S. patent application Ser. No. 15/946,403 describes two methods for determining the rotational speed of a machine. Described herein is a third method that was developed based on further research and testing. Enhancements in the third method include the consideration of a broader range of initial candidate rotational speeds and improvements to the evaluation algorithm that consider the relative amplitudes of the harmonic peaks and the relative importance of the higher harmonics. These enhancements have been shown to significantly improve the reliability of the rotational speed determination, especially when an initial rotational speed is in question.

In view of the foregoing, embodiments described herein provide an apparatus for determining an estimated rotational speed of a rotating component of a machine in the absence of a reliable tachometer signal to indicate an actual rotational speed. In one aspect, the apparatus comprises a vibration sensor attached to the machine that generates an analog vibration signal indicative of vibration of the machine, and an analog-to-digital converter that converts the analog vibration signal to digital vibration data. The apparatus includes a processor that executes instructions to process the digital vibration data, including instructions to:

determine a range of rotational speeds for the machine based on historical data recorded for the machine;

generate a vibration spectrum based on the digital vibration data that includes vibration amplitude values associated with frequency values;

identify a plurality of vibration peaks in the vibration spectrum, each having a peak amplitude value and a peak frequency value;

determine a maximum peak amplitude of the peak amplitude values;

determine a plurality of candidate frequency values in the vibration spectrum, wherein each candidate frequency value is within the range of rotational speeds and is associated with a corresponding family of harmonics;

for each harmonic of the corresponding family of harmonics, identify a nearest peak that is within a spectral peak frequency tolerace of the harmonic, the nearest peak having a nearest peak frequency value and a nearest peak amplitude value;

for each harmonic of the corresponding family of harmonics, determine an error value based at least in part on a difference between the candidate frequency value and the nearest peak frequency value;

for each candidate frequency value, determine an error sum value, which is an iterative sum of the error values determined for the harmonics of the corresponding family of harmonics;

determine the estimated rotational speed of the machine based on the candidate frequency value having a largest error sum value; and analyze the digital vibration data using the estimated rotational speed of the machine to determine an operational characteristic of the machine.

In some embodiments, the spectral peak frequency tolerace is three times a bin width of the vibration spectrum.

In some embodiments, the error value is determined based at least in part on a ratio of $$\frac{A_{max}}{A_p},$$

where $A_{max}$ is the maximum peak amplitude of the peak amplitude values of the plurality of vibration peaks, and $A_p$ is the nearest peak amplitude value.

In some embodiments, contributions of higher-order harmonic peaks in the iterative sum of error values are successively reduced by a chosen reduction factor, such as 10 percent.

In some embodiments, the range of rotational speed is bounded by a lower limit and an upper limit that are based on a median speed of the machine over a period of operation, wherein the lower and upper limits are determined according to:

lower limit=(median speed)/2 and upper limit=(median speed)×2.

In another aspect, embodiments described herein provide an apparatus for determining an estimated rotational speed of a rotating component of a machine in the absence of a reliable tachometer signal to indicate an actual rotational speed. A preferred embodiment of the apparatus includes a vibration sensor, an analog-to-digital converter, an input device, and a processor. The vibration sensor is attached to the machine and generates an analog vibration signal indicative of vibration of the machine: The analog-to-digital converter converts the analog vibration signal to digital vibration data. The input device receives input information from a user, including a nominal speed value indicating a nominal rotational speed associated with the machine. The processor executes instructions to process the digital vibration data, including instructions to:

(1) receive the nominal speed value from the input device;

(2) generate a vibration spectrum based on the digital vibration data, wherein the vibration spectrum includes vibration amplitude values associated with frequency values; and (3) identify a plurality of vibration peaks in the vibration spectrum, each of the vibration peaks having a peak amplitude value and a peak frequency value associated therewith.

For j=1 to the processor executes instructions to:

(4) determine a jth set of frequency values comprising:
 a jth candidate frequency value related to the nominal speed value; and
 a plurality of jth harmonic frequency values distributed incrementally across the vibration spectrum;

(5) for each candidate and harmonic frequency value in the jth set, determine one of the vibration peaks identified in step (3) having a peak frequency value that is closest to the candidate or harmonic frequency value;

(6) for each candidate and harmonic frequency value in the jth set, determine a frequency difference value indicating a difference between the candidate or harmonic frequency value and the peak frequency value that is closest;

(7) generate a jth sum of the frequency difference values corresponding to the jth set of frequency values, and associate the jth sum with the candidate frequency value of the jth set of frequency values;

(8) increment j by one and repeat steps (4) through (8) until j equals J;

(9) determine a minimum sum of the J number of sums of the frequency difference values;

(10) determine the estimated rotational speed of the machine based on the candidate frequency value associated with the minimum sum; and (11) analyze the digital vibration data using the estimated rotational speed of the machine to determine an operational characteristic of the machine.

In some embodiments, for j=1, the jth candidate frequency value corresponds to about half of the nominal rotational speed.

In some embodiments, for j=the jth candidate frequency value corresponds to about 1.5 times the nominal rotational speed.

In some embodiments, the nominal speed value is a nameplate rotational speed of the machine.

In some embodiments, J ranges from about 0 to about 100.

In some embodiments, the peak frequency value determined in step (5) is greater than or less than the closest candidate or harmonic frequency value.

In some embodiments, the jth set of frequency values includes eight harmonic frequency values.

In some embodiments, the number of vibration peaks identified in step (3) is less than or equal to LOR/4, and wherein LOR is lines of resolution of the vibration spectrum.

In some embodiments, if it is determined that there are more than one minimum sum in the J number of sums of the frequency difference values, the processor executes instructions to:

(12) for each of the J sets of frequency values, determine a sum of the peak amplitude values of the vibration peaks identified in step (3) that have peak frequency values closest to the candidate and harmonic frequency values;

(13) determine a maximum sum of the 0.1 number of sums of the peak amplitude values determined in step (12); and (14) determine the estimated rotational speed of the machine based on the candidate frequency value associated with the maximum sum.

In yet another aspect, embodiments described herein provide an apparatus for determining an estimated rotational speed of a rotating component of a machine in the absence of a reliable tachometer signal to indicate an actual rotational speed. A preferred embodiment of the apparatus includes a vibration sensor, an analog-to-digital converter, an input device, and a processor. The vibration sensor is attached to the machine and generates an analog vibration signal indicative of vibration of the machine. The analog-to-digital converter converts the analog vibration signal to digital vibration data. The input device receives input information from a user, including a percent accuracy value (% Accuracy) and a start frequency value (StartFreq) indicating a nominal rotational speed associated with the machine. The processor executes instructions to process the digital vibration data, including instructions to:

(1) receive the percent accuracy value and the start frequency value from the input device;
(2) generate a vibration spectrum based on the digital vibration data that includes vibration amplitude values associated with frequency values;
(3) identify K number of vibration peaks in the vibration spectrum, each having a peak amplitude value (AmplLocPeak(k)) and a peak frequency value (FreqLocPeak(k)) associated therewith;
(4) for each of N number of harmonics of the start frequency value, determine candidate frequency values (FreqCandidate(j)) for which the following relationship is true:

$|FreqLocPeak(k) - (n \times StartFreq)| \leq \%\ Accuracy$ (5) for each of the candidate frequency values determined in step (4), determine a percentage difference value (PctDiff) according to:

$$PctDiff = \frac{[FreqLocPeak(k) - n \times (FreqCandidate(j))]}{n \times (FreqCandidate(j))}$$

and a score value according to:

score value=|-PctDiff (6) for each harmonic family of the vibration peaks located in step (3), determine a total score, which is a sum of all score values determined in step (5);
(7) determine the estimated rotational speed of the machine based on the candidate frequency value associated with the harmonic family having a largest total score; and
(8) analyze the digital vibration data using the estimated rotational speed of the machine to determine an operational characteristic of the machine.

In some embodiments, if the largest total score is associated with more than one harmonic family, determine the estimated rotational speed of the machine based on the candidate frequency value associated with the harmonic family having a largest vibration peak amplitude located in step (3).

In some embodiments, the percent accuracy value ranges from about 0.5 percent to about 2 percent.

Accordingly, using the apparatus described herein, a user may be able to either improve the accuracy of the assumed rotational speed by scanning across the vibrational spectral peaks or, if this does not reflect a reasonable rotational speed, then to scan across all the spectral peaks to determine the most likely rotational speed.

BRIEF DESCRIPTION OF THE DRAWINGS

Embodiments of the present invention may be best understood by reference to the detailed description of preferred embodiments when considered in conjunction with the following drawings, in which.

DETAILED DESCRIPTION OF THE INVENTION

The above and other needs are met by an apparatus for use in determining the rotational speed of a machine, such as a shaft of a pump, motor, turbine, compressor, gear box, and the like using vibrational data. Such apparatus, as described in more detail below, may be used in the absence of a tachometer or nameplate information about the rotational speed of the machine.

Vibration analyzers are useful to sense, analyze, and record vibration in rotating equipment. Such vibration that is due to a fault can, if left uncorrected, degrade the efficiency of, or even destroy the rotating equipment. Preferably, a portable or hand-held analyzer is used to collect and analyze vibration data, which may also be uploaded and stored in a central computer for further analysis. Aspects of the invention are not limited to portable or hand-held vibration analyzers, as continuous or on-line analyzers may also be used to collect vibration data as well as vibration analysis software programs used in post-acquisition analysis of vibration data.

Figure 1:
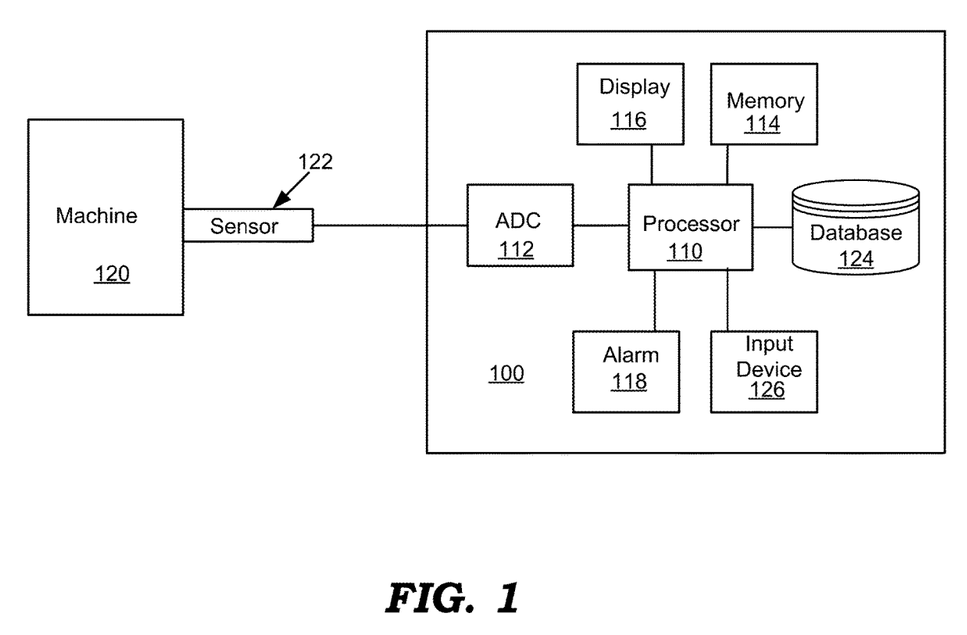
FIG. 1 is a schematic illustration of a vibration analyzer according to embodiments of the disclosure.

As shown in FIG. 1, a schematic drawing of a vibration analysis system 100, according to aspects of the invention, includes a processor 110, an analog to digital converter (ADC) 112, a memory 114, a display device 116, an alarm device 118, and a vibration data database 124. Vibration of a machine 120 is detected by a vibration sensor 122 for input to the vibration analysis system 100. Signals from the vibration sensor 122 are converted to digital data by the ADC 112, and the digital vibration data is stored in the memory 114. Spectral plots of the vibration data are generated by Fast Fourier Transform (FFT) processing by the processor 110, which plots are used in deriving the rotational speed of the machine 120 as described herein. Once the rotational speed of the machine is determined, the vibration data may be used to determine the source of the vibration so that the vibration can be corrected before damage occurs.

Method 1

Two embodiments of a first method for determining the rotational speed of the machine 120 are described herein with reference to FIGS. 2-6. A first embodiment is described with reference to FIGS. 2-4, and a second embodiment is described with reference to FIGS. 3, 5, and 6.

Figure 2:
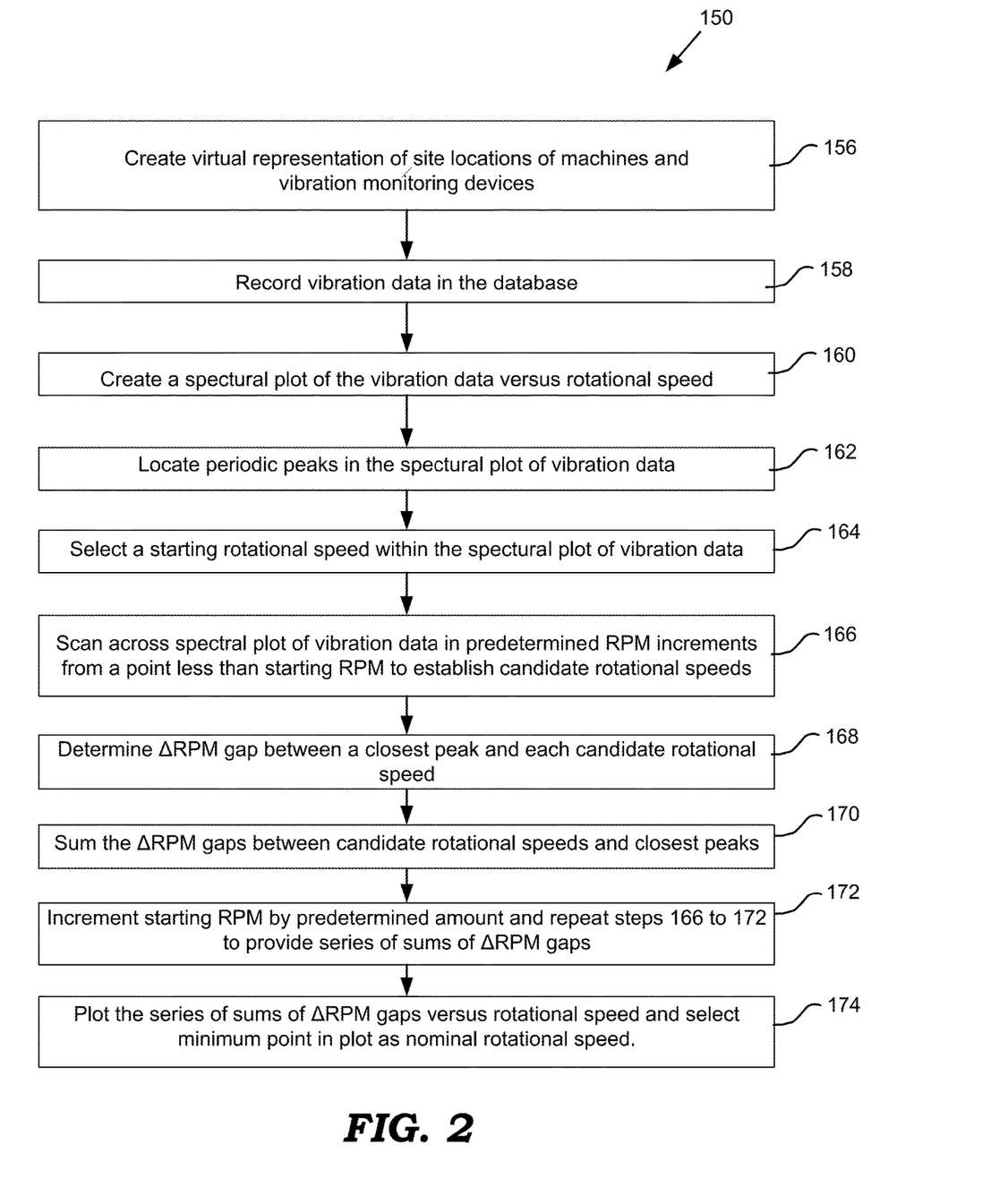
FIG. 2 is a block diagram of steps of collecting and using vibrational data using an apparatus according to an embodiment of a first method.
Figure 3:
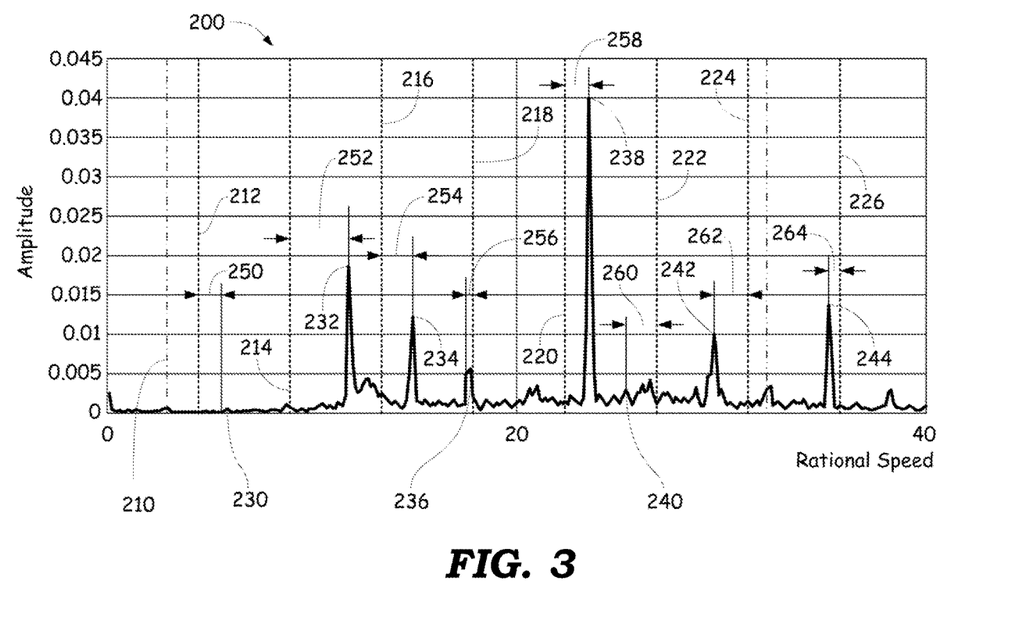
FIG. 3 is a graph of peaks in a spectral plot versus rotational speed for the apparatus according to the first method.

FIG. 2 is a block diagram of a procedure 150 for determining rotational speed, and FIG. 3 is a spectral plot 200 of vibration data generated by the processor 110. With reference to FIG. 2, a virtual representation of locations of machines 120 and vibration sensors 122 is created in the analyzer memory 114 (step 156). Vibration data for the machine 120 is recorded in the database 124 as measured by the sensors 122 (step 158). Using the recorded data, the spectral plot 200 of the data is created as shown in FIG. 3 (step 160). In the spectral plot 200, the y-axis indicates the amplitude of vibration peaks and the x-axis represents frequency in cycles per second (Hz) or rotational speed in revolutions per minute (RPM). It will be appreciated that a frequency in Hz may be converted to RPM and vice versa. Peaks in the spectral plot 200 are located by any conventional peak location method (step 162). For example, peaks may be located by interpolation, summation, or fitting techniques known to those skilled in the art. Each peak in FIG. 3 has associated with it an amplitude (ie., acceleration, velocity, or displacement), or in other words, the energy present in the movement of the rotating equipment occurring at the specific frequency of the peak.

According to the first embodiment of the first method, a starting rotational speed 210 is selected by a user (step 164). The starting rotational speed 210 may be selected based on a published rotational speed for the machine 120 or an assumed rotational speed based on comparable machines. The spectral plot 200 is scanned in predetermined speed increments from a point that is slightly less than the starting rotational speed 210 to generate multiple candidate rotational speeds 212, 214, 216, 218, 222, 224, and 226 (step 166). For example, if a total of six to ten candidate rotational speeds are generated across the spectrum, the candidate rotational speeds will be separated by increments of ⅙ to ​⅒ of the total rotational speed span. In one preferred embodiment, the increments are ​¹⁄₁₀₀ of the starting rotational speed 210, and begin at about half of the starting rotational speed 210 and end at about 1.5 times the starting rotational speed 210. The range and increments are preferably user definable and depend on the actual spectrum being scanned.

Next, peaks 230, 232, 234, 236, 238, 240, 242, and 244 in the spectrum that are closest to each of the candidate rotational speeds are identified. These closest peaks may be at rotational speeds that are higher or lower than each of the candidate rotational speeds. The speed differences (ΔRPM) between the peaks and the candidate rotational speeds are determined and are defined as ΔRPM gaps 250, 252, 254, 256, 258, 260, 262, and 264 between the peaks 230-244 and the candidate rotation speeds 214-226 (step 168). The total sum of the ΔRPM gaps is calculated (ΣAbs(ΔRPM)) and stored in memory (step 170). Harmonics of the closest peaks are also determined, the rotational speed candidates of the closest peaks to each of those harmonics of the rotational speed candidates are identified, and the gaps between the rotational speed candidates of the calculated harmonics and their closest peaks are summed and recorded in memory (step 172). In some embodiments, eight calculated harmonics are used, and in other embodiments the number of harmonics is user-definable.

Figure 4:
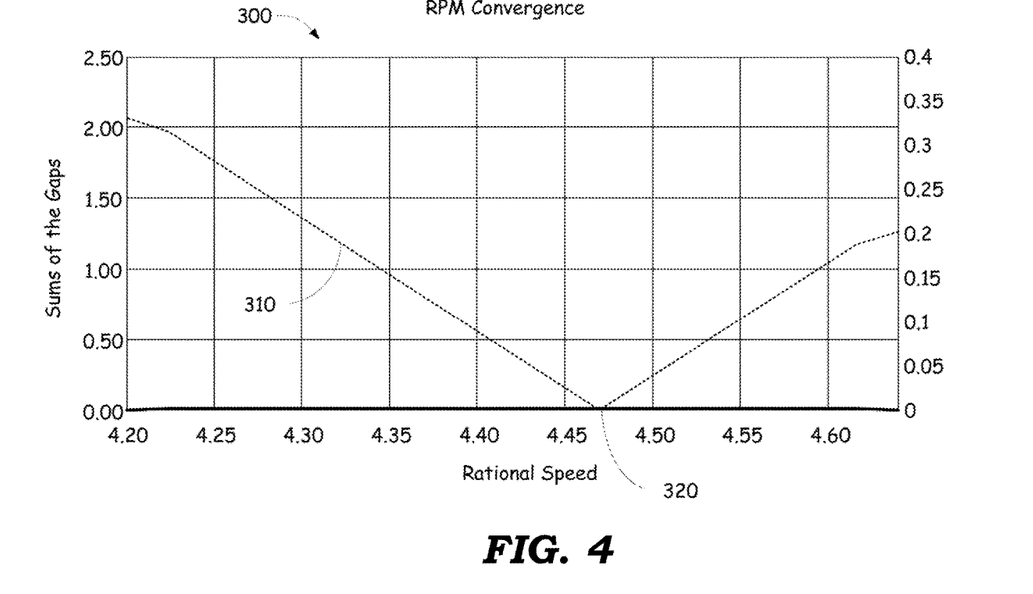
FIG. 4 is a plot of a sum of gaps between peaks and rotational speeds versus rotational speed showing a nominal rotational speed as a minimum sum according to the first method.

As depicted in the plot 300 of FIG. 4, the sum of the gaps 250-264 for each set of candidate rotational speeds and their harmonics is plotted verus rotational speed to provide a V-shaped line having a minimum at point 320. As the candidate rotational speed increases, the sums of the gaps (line 310) typically decrease, reach a minimum at point 320, and then increase. The candidate rotational speed at the minimum 320 is a more accurate estimate of the machine's actual RPM, which can be used to more accurately re-calculate various vibration scalar parameters, such as energy in a range.

In some situations, the starting rotational speed 210 (step 164) may be far removed from the actual rotational speed, such as due to input errors. This typically occurs when a user enters an incorrect RPM value when using a portable vibration analyzer. In this situation, no reasonable starting point is available for the turning speed, in which case there is no basis for the starting and ending points for the scan described in the first embodiment of the first method. According to the second embodiment of the first method, the scan process described above starts near zero rotational speed, and extends up to about ⅛th of the total frequency range of the harmonic spectrum. Rotational speed candidates are identified within this range as described in the first embodiment of the first method, and sums of the ΔRPM gaps for the candidate rotational speeds are calculated. In this case, unlike the case depicted in FIG. 4, there are multiple peaks and troughs in the plot of candidate RPM versus the sum of the ΔRPM gaps (see FIG. 6).

Figure 5:
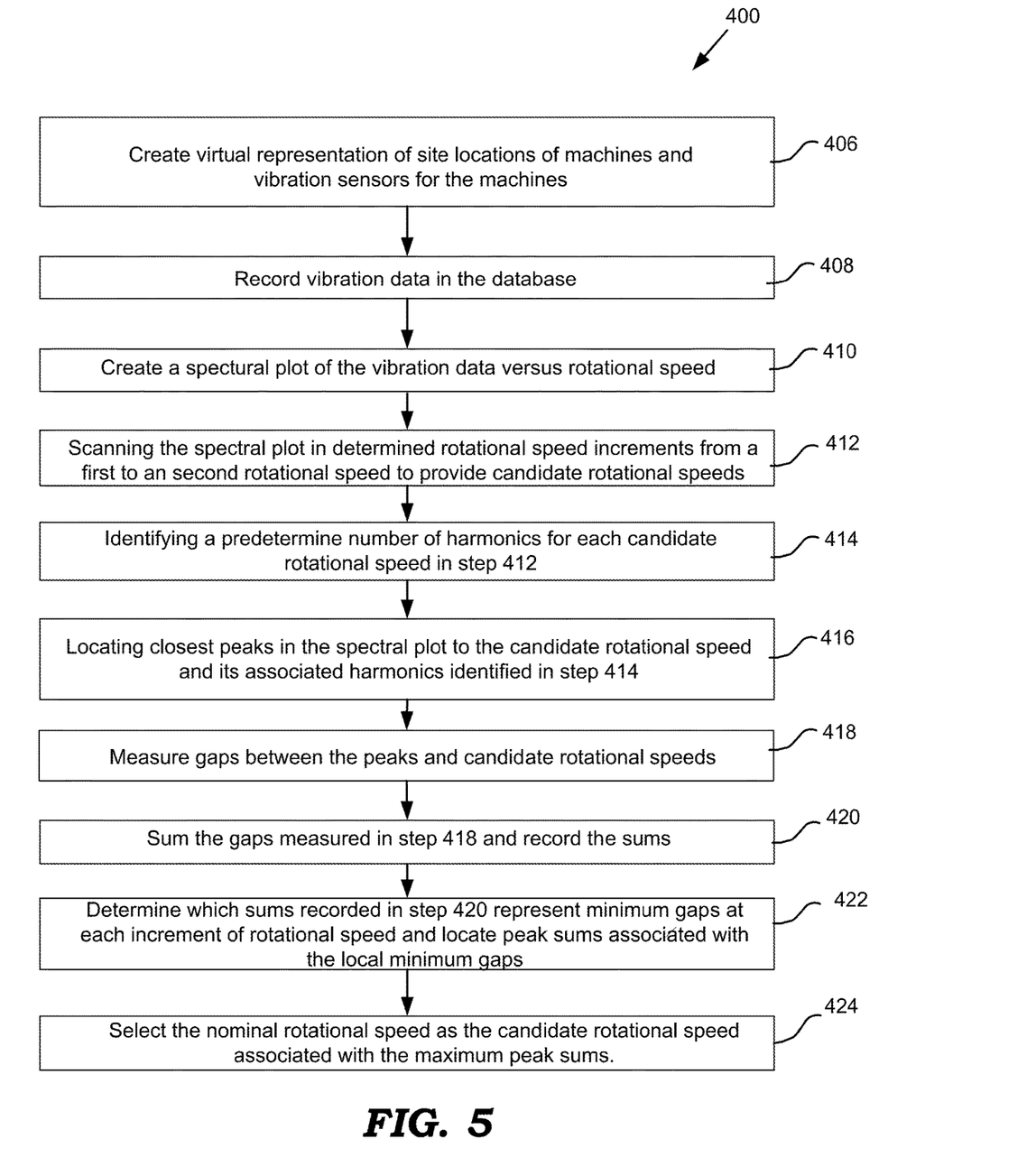
FIG. 5 is a block diagram of steps of collecting and using vibrational data using an apparatus according to another embodiment of the first method.
Figure 6:
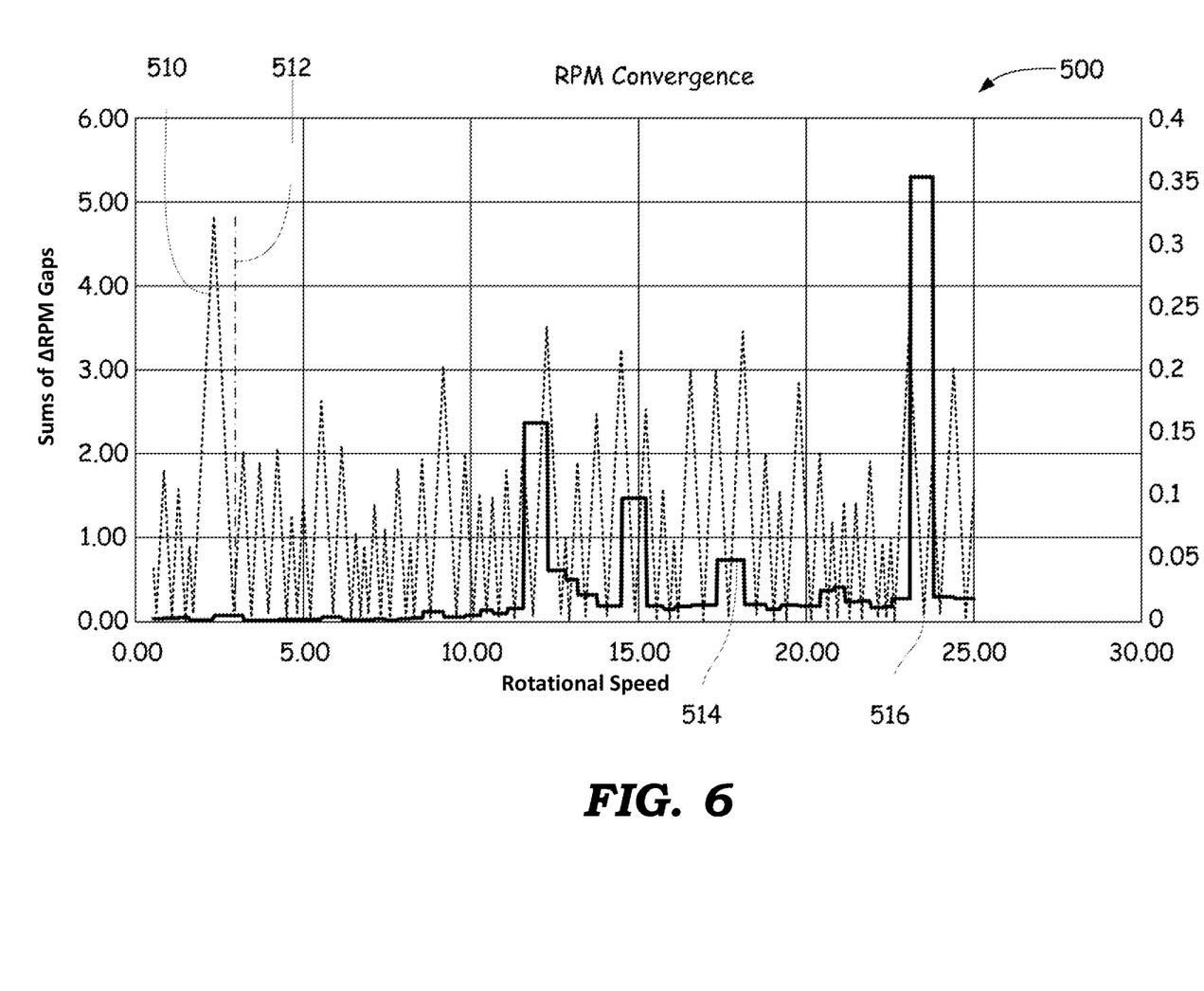
FIG. 6 is a graph of vibrational data using an apparatus according to the first method to find a nominal rotational speed from a sum of minimum gaps between a candidate rotational speed and its closest peak.

With reference now to FIGS. 3, 5, and 6, a procedure 400 for determining rotational speed using the vibration analyzer 100 according to the second embodiment of the first method is illustrated. Steps 406 to 420 are similar to steps 156 to 170 described above, and thus will not be repeated. FIG. 6 depicts a plot 500, in which the y-axis represents the value of the sums of the ΔRPM gaps determined in step 420 and the x-axis represents the frequency in cycles per second (Hz) or rotational speed in revolutions per minute (RPM). The sums of the gaps are indicated by the zigzag line 510 in FIG. 6, which shows a number of minimum sums and peak sums. If available, a user-entered rotational speed is indicated by line 512 in FIG. 6. In order to determine which of the minimum sums is the actual rotational speed, the peak levels closest to each of the rotational speed increments are summed and plotted in FIG. 6 as line 514 (step 422). The rotational speed candidates having the highest peak sums indicate the most likely candidates for the actual rotational speed of the machine 120 (step 424). In this case, the highest peak sums are assicuated with the minimum point 516. While the foregoing is not an exact determination of the rotational speed, the most likely candidates taken together with detailed information about the machine 120, such as number of poles, number of gear teeth, and the like, provide useful information for determining the actual rotational speed of the machine 120.

Method 2

When the rotational speed is not represented within a measured harmonic spectrum, the first method described above may not be able to identify a nominal rotational speed of the machine 120. A second method finds the speed of the machine as the fundamental frequency in a harmonic family. The fundamental frequency does not have to be present in the harmonic family. A preferred embodiment of the second method finds the fundamental frequency as a best fit based on a scoring procedure.

Following are some definitions that are pertinent to the description of the second method.

LocPeak(k) This is the set of the largest amplitude peaks that are located in the originating spectrum. Each peak within the set has a located frequency (FreqLocPeak(k)) and located amplitude (AmplLocPeak(k)), where:

k=1, 2, 3, . . . K, and the value of K is chosen by the analysist as the number of located peaks to be considered for evaluation. In preferred embodiments, K should be ≤LOR/4, where LOR is a value indicating the number of lines of resolution of the originating spectrum.

FreqCandidate(j) This is the set of located frequency values that are candidate values for the fundamental frequency (speed), where:

j=1, 2, 3, . . . J, and the value of J represents the number of candidate frequencies to be considered as the fundamental frequency.

AmplCandidate(j) This is the set of located amplitude values associated with the FreqCandidate(j) candidate values.

StartFreq The start frequency value is the nominal frequency that is used as an initial guess at the fundamental frequency (speed). For motors, if a tachometer is not present and the speed is unknown, this is usually the nameplate speed value.

% Accuracy The percent accuracy value defines how close to the StartFreq value that a LocPeak(k) value is to be. For a LocPeak(k) to be considered as a FreqCandidate(j):

|FreqLocPeak($k$)−($n$×(StartFreq))|≤% Accuracy where, n=1, 2, 3, . . . N, and the value N is the number of harmonics of the start frequency to be evaluated. The value N should be less than int $$\left(\frac{StartFreq}{Fmax}\right)$$

rounded down to the nearest integer.

Figure 7:
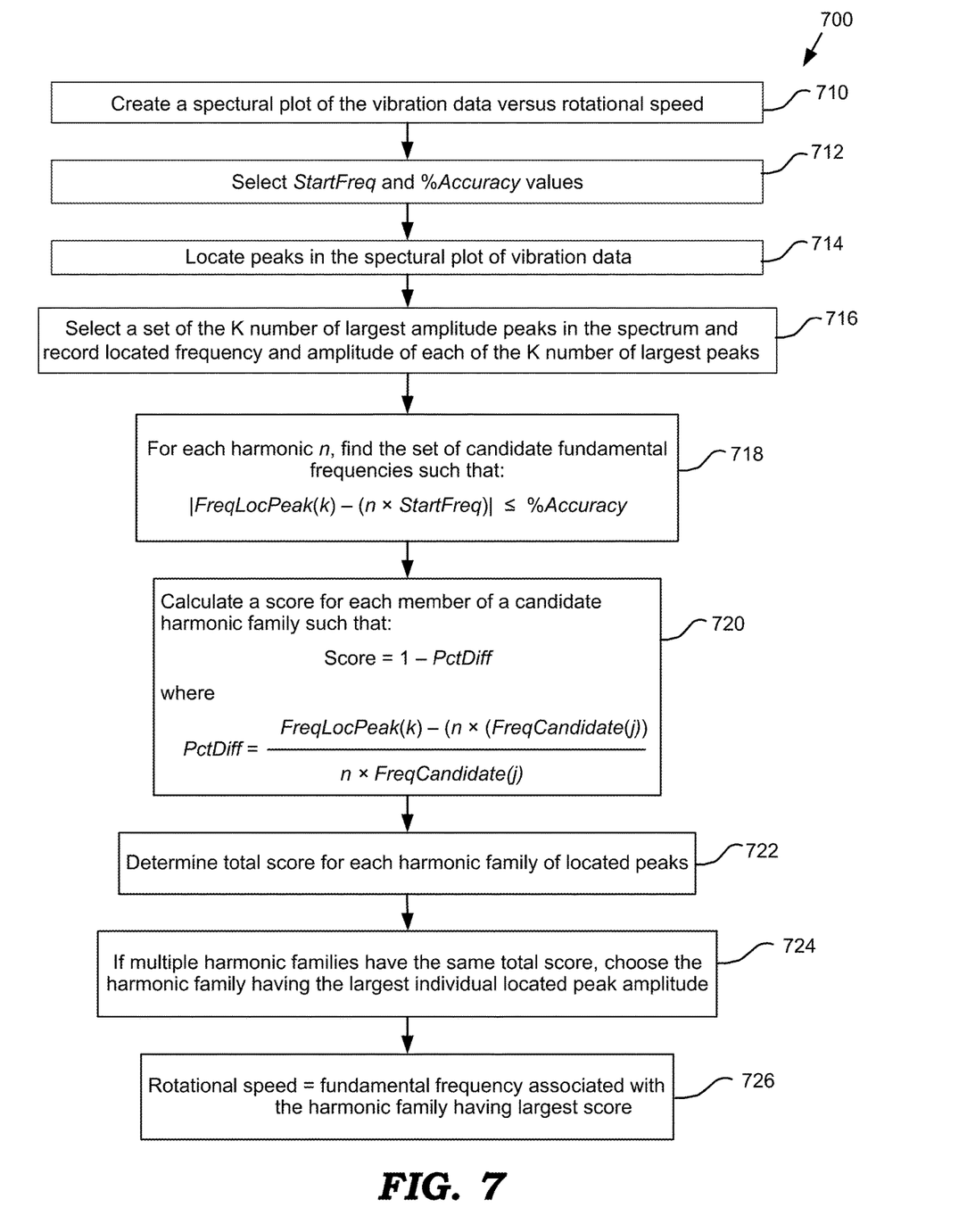
FIG. 7 is a block diagram of steps of collecting and using vibrational data using an apparatus according to an embodiment of a second method.
Figure 8:
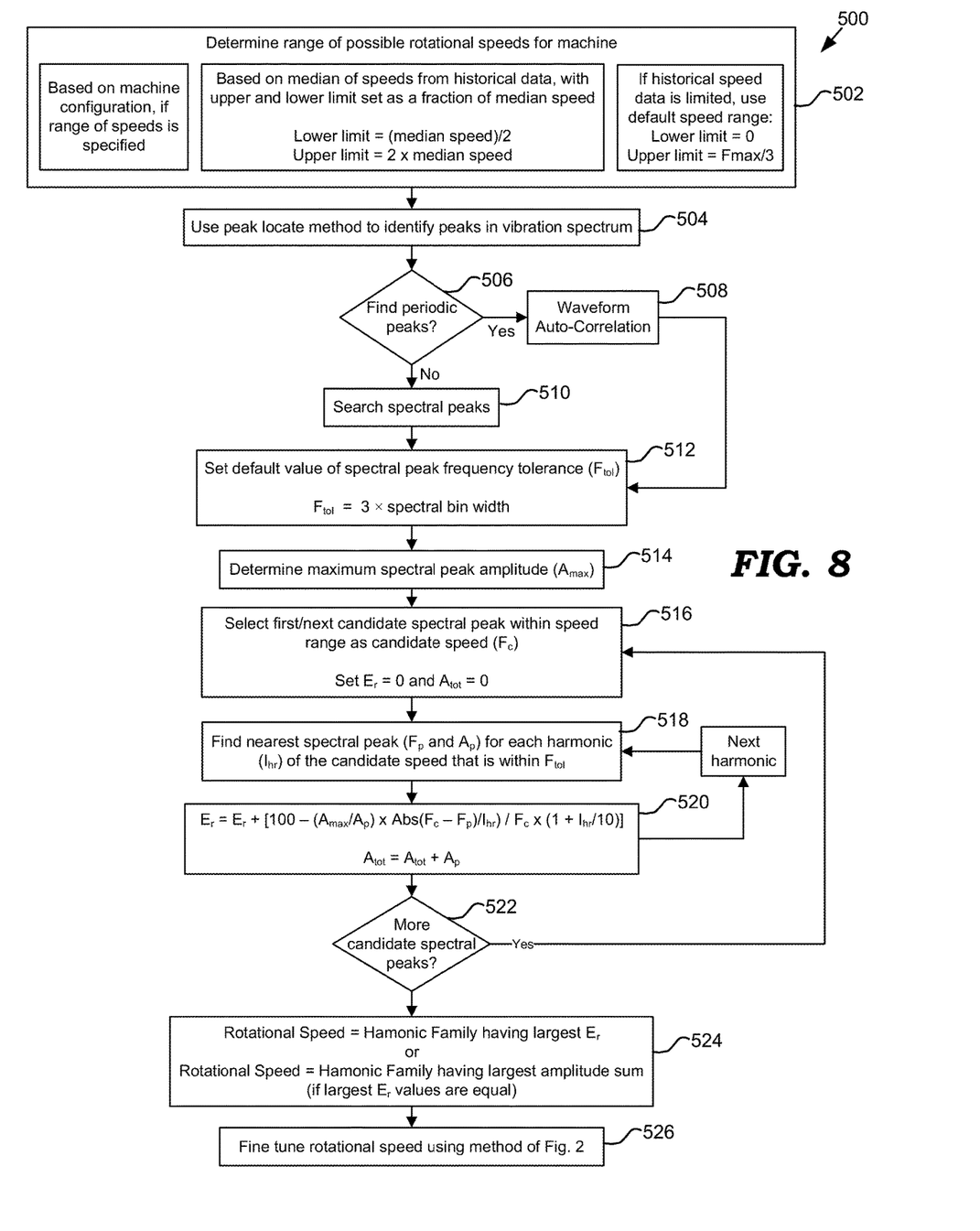
FIG. 8 is a block diagram of steps of collecting and using vibrational data using an apparatus according to an embodiment of a third method.

FIGS. 7 and 8 depict a procedure 700 for determining machine rotational speed according to a preferred embodiment of the second method. Similar to the previously described method, vibration data for the machine 120 is measured by the sensors 122 and recorded in the database 124, and a spectral plot of the data is created based on the recorded data (step 710). Thereafter, StartFreq and % Accuracy are selected by the user using the input device 126 (step 712). The StartFreq value may be provided by a customer, may be indicated by nameplate information on the machine, or may be based on the history of similar machines operating under similar conditions. The % Accuracy value is preferably a user-selected value that ranges from about 0.5 percent to about 2 percent.

The spectrum is surveyed to locate the peaks therein using the peak location method described above (step 714). The K number of largest amplitude peaks of the located peaks in the spectrum are found and LocPeak(k) is created, which includes the amplitude (AmplLocPeak(k)) and associated frequency (FreqLocPeak(k)) of each peak (step 716). For each harmonic n, the set of candidate fundamental frequencies are determined such that:

|FreqLocPeak($k$)−($n$×StartFreq)|≤% Accuracy    (step 718).

A score is then calculated for each member of a candidate harmonic family such that:

Score=1−PctDiff where $$PctDiff = \frac{FreqLocPeak(k) - (n \times (FreqCandidate(j)))}{n \times (FreqCandidate(j))} \text{(step 720)},$$

and a total score for each harmonic family of located peaks is determined (step 722). If multiple harmonic families have the same total score, the harmonic family having the largest individual located peak amplitude is chosen as having the highest score (step 724). The estimated rotational speed of the machine 120 is then determined to be the fundamental frequency associated with the harmonic family having largest total score (step 726).

The process of FIG. 7 expressed in pseudo-code is set forth below.

```
j=1
For n=1, . . . ,N
    {For k=1, . . . ,K
        {(IF |FreqLocPeak(k) − n * (StartFreq)| ≤ %Accuracy)
            FreqCandidate(j) = FreqLocPeak(k)/n
            AmplCandidate(j) = AmplLocPeak(k)
            j=j+1
        ENDIF
        }
    } J=j
For j=1, . . . ,J        ;Calculate a total score for each FreqCandidate(j)
{
TotalScore = 0
    For n=1, . . . ,N       ;Calculate a score for each harmonic of
                             FreqCandidate(j)
    {
    Score = 0
    minPctDiff = %Accuracy
    For k=1, . . . ,K       ;Find the score for each n*(FreqCandidate(j))
    {
```

$$PctDiff = \frac{[FreqLocPeak(k) - n*(FreqCandidate(j))]}{n*(FreqCandidate(j))}$$

```
    IF (PctDiff ≤ minPctDiff)    ;Find the minimum PctDiff for each
                                   n*(FreqCandidate(j))
        minPctDiff = PctDiff
        Score = 1 − PctDiff      ;Score for each n*FreqCandidate(j)
    ENDIF
    }
    TotalScore = TotalScore +Score
    }
FreqCandidateScore(j) = TotalScore
}
MaxScore = FreqCandidateScore(1)
MaxIndex = 1
Pct = 1/100                      ;Values are to be considered equivalent if
                                  they are within ±Pct of each other
For j=2, . . . ,J
{
IF (FreqCandidateScore(j) > MaxScore)
    MaxScore = FreqCandidateScore(j)
    MaxIndex = j
ELSEIF ((FreqCandidateScore(j) > (Pct)* MaxScore) OR
        (FreqCandidateScore(j) < (Pct)* MaxScore))
    THAN
    IF (AmplCandidate(j) ≥ AmplCandidate(MaxIndex))
        MaxScore = FreqCandidateScore(j)
        MaxIndex = j
    ENDIF
ENDIF
}
```

Fundamental Frequency (Speed)=FreqCandidate(MaxIndex)

Method 3

In many situations, particularly with route based portable vibration data collection, the reported rotational speed may be inaccurate or not reported at all, likely due to human error. In these situations, it is advantageous for the speed determination algorithm to operate on a broad range of possible candidate rotational speeds. The use of variable speed machines is another situation in which a particularly broad range of candidate speeds is advantageous.

As described herein with reference to FIG. 8, an embodiment of a third method 500 for determining the rotational speed of the machine 120 begins with determination of a broad range of possible rotational speeds (step 502). If a machine configuration file is available that specifies the range of rotational speeds for the particular machine, the method can use that specified range. Alternatively, if some history of machine rotational speed has been recorded, the range of speeds can be determined by finding the median speed and applying a factor x to attain an upper and lower limit to the speed range. The lower limit may be determined by dividing the median speed by the factor x, and the upper limit may be determined by multiplying the median speed by the factor x. In one exemplary embodiment in which x=2, Lower Limit=(Median Speed)/2, and Upper Limit=(Median Speed)×2.

If no or very little historical speed data is recorded, then the lower limit may be set to a default value of zero (or very close to zero) and the upper limit may be set to a default value of $F_{max}/3$.

Peaks in the vibration spectrum are then located by a peak location method, such as any of the methods described above (step 504). This speed detection algorithm can be applied to any vibration spectrum. An additional step to eliminate noise peaks that are a subset of the located peaks involves evaluating only the periodic peaks (step 506). If evaluation of only periodic peaks is desired, step 508 represents the implementation of methods described in U.S. Pat. No. 9,791,422 (Analysis of Periodic Information in a Signal) and U.S. Patent Publication No. US2018/0011065A1 (Machine Fault Prediction Based on Analysis of Periodic Information in a Signal). Otherwise, a search of all located spectral peaks (step 510) is implemented. A spectral peak frequency tolerace ($F_{tol}$) is set to a default value according to $$F_{tol}=3\times\text{Spectral Bin Width} \quad \text{(step 512)}.$$

As discussed in more detail hereinafter, an improved algorithm for determining each candidate rotational speed harmonic family takes into consideration the relative amplitudes of the harmonic peaks. This has the effect of making the higher-amplitude spectral peaks more significant than the lower-amplitude spectral peaks. The maximum spectral peak amplitude ($A_{max}$), which is determined at step 514, is used in normalizing the relative amplitude of all of the spectral peaks.

Beginning at the lower limit of the speed range determined in step 502, a first (or next) candidate spectral peak having a candidate speed ($F_c$) is selected, an error value ($E_r$) is set to zero, and a total peak amplitude value ($A_{tot}$) is set to zero (step 516). For each harmonic ($I_{hr}$) of the candidate speed ($F_c$), a nearest peak is found that is within the spectral peak frequency tolerace ($F_{tol}$) of the harmonic (step 518). This nearest peak has a peak frequency ($F_p$) and a peak amplitude ($A_p$). In step 520, the error value ($E_r$) is then determined according to:

$$E_r = E_r + \left[ 100 - \frac{A_{max}}{A_p} \times \frac{\left| \frac{F_c - F_p}{I_{hr}} \right|}{F_c} \times \frac{1+I_{hr}}{10} \right]$$

and the total peak amplitude value is calculated according to:

$$A_{tot}=A_{tot}+A_p.$$

Steps 518 and 520 are performed for each harmonic within each candidate rotational speed harmonic family, and the process loops back to step 516 to repeat the process for each candidate rotational speed (step 522).

In the calculation of $E_r$ as set forth above, the ratio $$\frac{A_{max}}{A_p}$$

normalizes the importance of each peak, such that the larger peaks are more important. Also, the contribution or importance of higher order harmonic peaks is successively reduced by a chosen percentage, which in a preferred embodiment is 10%. This provides a further improvement to the accuracy of determining each candidate rotational speed harmonic family.

The estimated rotational speed of the machine 120 is then determined to be the fundamental frequency associated with the candidate rotational speed harmonic family having the largest value of $E_r$ (step 524). If multiple harmonic families have the same value of $E_r$, the estimated rotational speed of the machine 120 is determined to be the fundamental frequency associated with the candidate rotational speed harmonic family having the largest peak amplitude sum $A_{tot}$.

There are situations in which the fundamental rotational speed peak determined in step 524 may still be slightly off from the actual machine rotational speed due in part to small rotational speed changes that occurred during the acquisition of the waveform data or due to wear in the bearings or other faults that occur in the machine. The rotational speed determined in step 524 can be further refined by finding the minimum frequency gap between the rotational speed and the located peak for each harmonic of the rotational speed according the the method of FIG. 2 (step 526).

Figure 9:
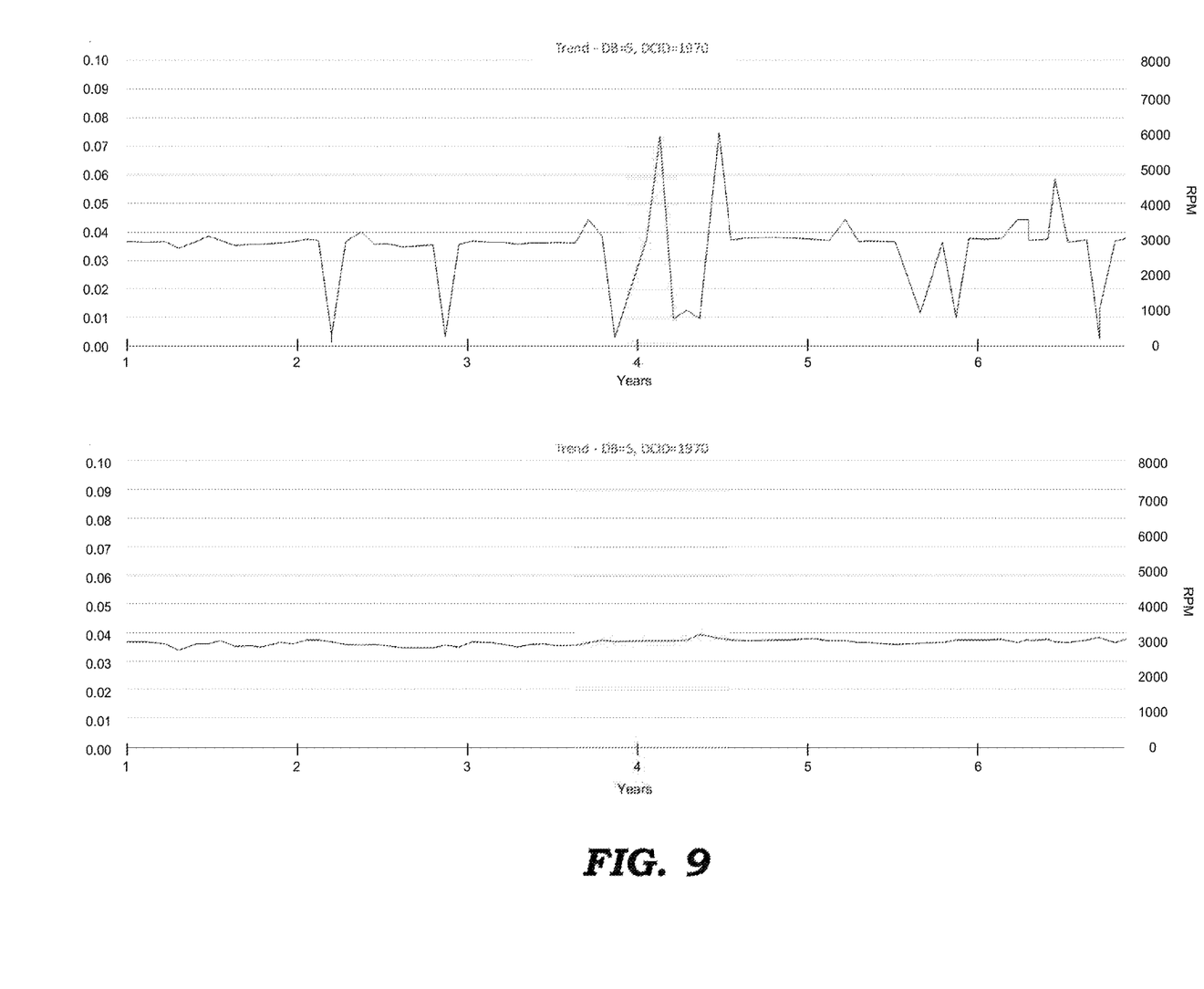
FIG. 9 depicts an example of the speed of a variable-speed machine measured over a period of time using a route-based portable vibration analyzer.

FIG. 9 depicts an example of the speed trend over a period of five years for a variable speed machine monitored using a route based portable vibration analyzer. In the example depicted in the upper plot, the speed was likely measured using a hand-held tachometer sensor. The large variations in the speed measurements are probably due to speed measurements being identified for the wrong machine shaft or due to a manual data entry error. In this particular case, the speed range was determined based on the median of the historical speed values, with the upper limit set to twice the median value and the lower limit set to half the median value. The lower plot in FIG. 9 shows the rotational speed trend after the method of FIG. 8 was applied.

Figure 10:
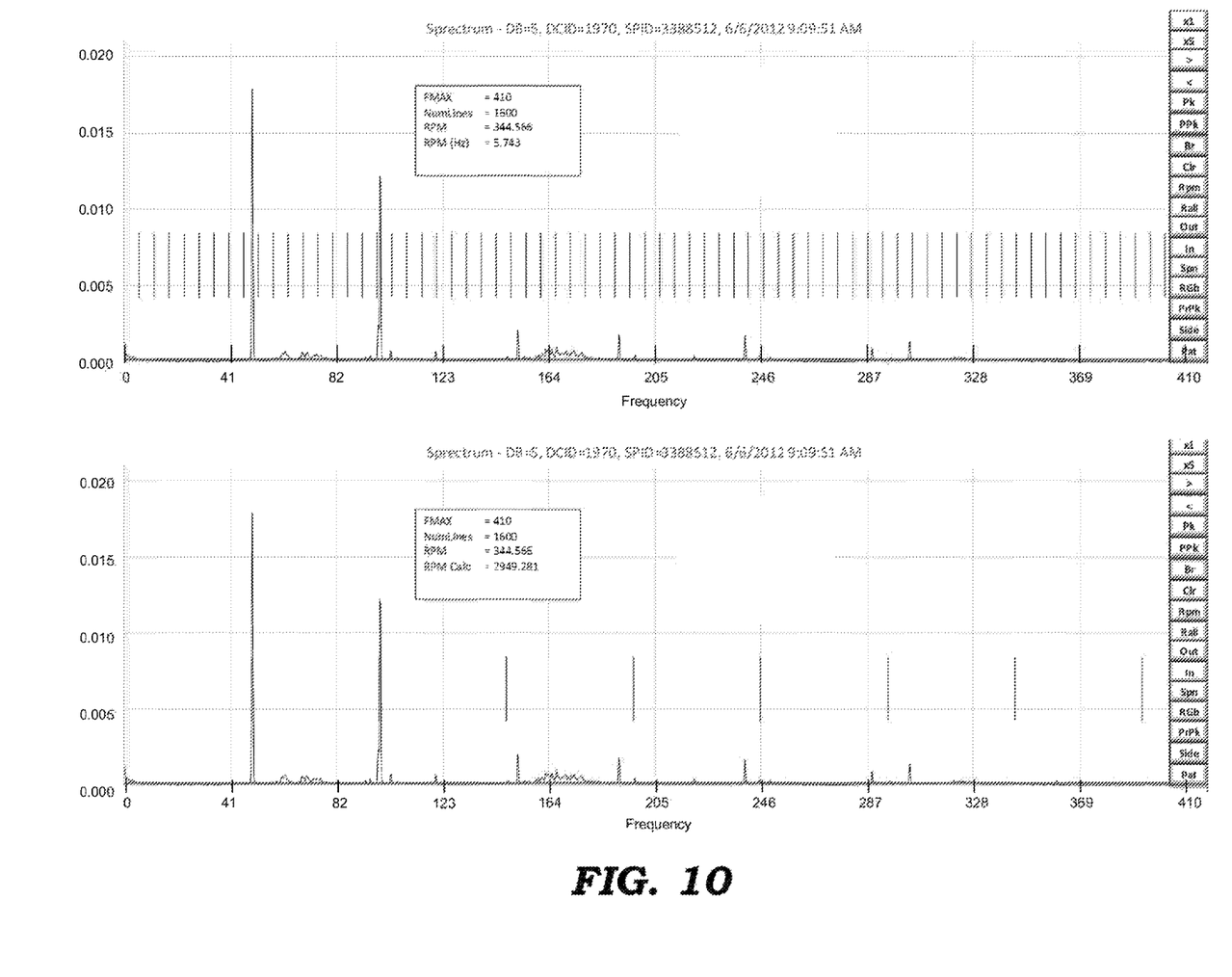
FIG. 10 depicts examples of spectral plots of vibration data including rotational speed harmonics, as measured on a machine for a case in which a rotational speed was recorded that was well below the actual speed of the machine (top), and after speed correction using the third method (bottom).

In FIG. 10, the upper spectral plot shows the original rotational speed harmonics for a case in which the recorded rotational speed was well below the actual rotational speed of the machine. The incorrect speed was most likely due to a manual data entry error. The lower spectral plot shows the rotational speed harmonics after the method of FIG. 8 has been applied.

Once the unknown rotational speed has been determined using one or more of the above methods, it can be used to analyze the test frequency spectrum, and thereby the characteristics of the machine. For example, the speed of a rotating shaft can be used with vibration information sensed from the shaft to locate problems such as unbalance, misalignment, and bearing damage. Once these problems have been diagnosed with the information, the technician can then correct the problems. Thus, the method of determining rotational speed as described is an important step in detecting, analyzing, and fixing problems with rotating equipment.

While preferred embodiments of the present invention are described above, it will be appreciated by those of ordinary skill in the art that the invention is capable of numerous modifications, rearrangements and substitutions without departing from the spirit of the invention.

What is claimed is:

1. An apparatus for determining an estimated rotational speed of a rotating component of a machine in the absence of a reliable tachometer signal to indicate an actual rotational speed, the apparatus comprising:
    a vibration sensor attached to the machine that generates an analog vibration signal indicative of vibration of the machine;
    an analog-to-digital converter in electrical communication with the vibration sensor that converts the analog vibration signal to digital vibration data;
    an input device that receives input information from a user, the input information including a nominal speed value indicating a nominal rotational speed associated with the machine;
    a processor in electrical communication with the analog-to-digital converter and the input device that executes instructions to process the digital vibration data, including instructions to:
    (1) receive the nominal speed value from the input device;
    (2) generate a vibration spectrum based on the digital vibration data, the vibration spectrum comprising vibration amplitude values associated with frequency values;
    (3) identify a plurality of vibration peaks in the vibration spectrum, each of the vibration peaks having a peak amplitude value and a peak frequency value associated therewith;
    for j=1 to J:
    (4) determine a jth set of frequency values comprising:
        a jth candidate frequency value related to the nominal speed value; and
        a plurality of jth harmonic frequency values that are greater than the jth candidate frequency value and distributed incrementally across the vibration spectrum;
    (5) for each candidate and harmonic frequency value in the jth set, determine one of the vibration peaks identified in step (3) having a peak frequency value that is closest to the candidate or harmonic frequency value;
    (6) for each candidate and harmonic frequency value in the jth set, determine a frequency difference value indicating a difference between the candidate or harmonic frequency value and the peak frequency value that is closest;
    (7) generate a jth sum of the frequency difference values corresponding to the jth set of frequency values, and associate the jai sum with the candidate frequency value of the jth set of frequency values;
    (8) increment j by one and repeat steps (4) through (8) until j equals J;
    (9) determine a minimum sum of the J number of sums of the frequency difference values;
    (10) determine the estimated rotational speed of the machine based on the candidate frequency value associated with the minimum sum; and
    (11) analyze the digital vibration data using the estimated rotational speed of the machine to determine an operational characteristic of the machine.

2. The apparatus of claim 1, wherein for j=1, the jth candidate frequency value corresponds to about half of the nominal rotational speed.

3. The apparatus of claim 1, wherein for j=J, the jth candidate frequency value corresponds to about 1.5 times the nominal rotational speed.

4. The apparatus of claim 1, wherein the nominal speed value is a nameplate rotational speed of the machine.

5. The apparatus of claim 1, wherein J ranges from about 10 to about 100.

6. The apparatus of claim 1, wherein the peak frequency value determined in step (5) is greater than or less than the closest candidate or harmonic frequency value.

7. The apparatus of claim 1, wherein the jth set of frequency values includes eight harmonic frequency values.

8. The apparatus of claim 1, wherein if it is determined that there are more than one minimum sum in the J number of sums of the frequency difference values, the processor executes instructions to:
    (12) for each of the J sets of frequency values, determine a sum of the peak amplitude values of the vibration peaks identified in step (3) that have peak frequency values closest to the candidate and harmonic frequency values;
    (13) determine a maximum sum of the J number of sums of the peak amplitude values determined in step (12); and
    (14) determine the estimated rotational speed of the machine based on the candidate frequency value associated with the maximum sum.

9. The apparatus of claim 1, wherein the number of vibration peaks identified in step (3) is less than or equal to LOR/4, and wherein LOR is lines of resolution of the vibration spectrum.

10. An apparatus for determining an estimated rotational speed of a rotating component of a machine in the absence of a reliable tachometer signal to indicate an actual rotational speed, the apparatus comprising:
    a vibration sensor attached to the machine that generates an analog vibration signal indicative of vibration of the machine;
    an analog-to-digital converter in electrical communication with the vibration sensor that converts the analog vibration signal to digital vibration data;
    an input device that receives input information from a user, the input information including a percent accuracy value (% Accuracy) and a start frequency value (StartFreq) indicating a nominal rotational speed associated with the machine;
    a processor in electrical communication with the analog-to-digital converter and the input device that executes instructions to process the digital vibration data, including instructions to:

(1) receive the percent accuracy value and the start frequency value from the input device;

(2) generate a vibration spectrum based on the digital vibration data, the vibration spectrum comprising vibration amplitude values associated with frequency values;

(3) identify K number of vibration peaks in the vibration spectrum, each of the vibration peaks having a peak amplitude value (AmplLocPeak(k)) and a peak frequency value (FreqLocPeak(k)) associated therewith;

(4) for each of N number of harmonics of the start frequency value, determine candidate frequency values (FreqCandidate(j)) for which the following relationship is true:

|FreqLocPeak(k)−(n×StartFreq)|≤% Accuracy (5) for each of the candidate frequency values determined in step (4), determine a percentage difference value (PctDiff) according to:

$$PctDiff = \frac{[FreqLocPeak(k) - n \times (FreqCandidate(j))]}{n \times (FreqCandidate(j))}$$

and a score value according to:

score value=1−PctDiff (6) for each harmonic family of the vibration peaks located in step (3), deter mine a total score, which is a sum of all score values determined in step (5);

(7) determine the estimated rotational speed of the machine based on the candidate frequency value associated with the harmonic family having a largest total score; and (8) analyze the digital vibration data using the estimated rotational speed of the machine to determine an operational characteristic of the machine.

11. The apparatus of claim 10, wherein, if the largest total score is associated with more than one harmonic family, determine the estimated rotational speed of the machine based on the candidate frequency value associated with the harmonic family having a largest vibration peak amplitude located in step (3).

12. The apparatus of claim 10, wherein the percent accuracy value ranges from about 0.5 percent to about 2 percent.

13. An apparatus for determining an estimated rotational speed of a rotating component of a machine in the absence of a reliable tachometer signal to indicate an actual rotational speed, the apparatus comprising:

a vibration sensor attached to the machine that generates an analog vibration signal indicative of vibration of the machine;

an analog-to-digital converter in electrical communication with the vibration sensor that converts the analog vibration signal to digital vibration data;

an input device that receives input information from a user, the input information including a percent accuracy value and a start frequency value indicating a nominal rotational speed associated with the machine;

a processor in electrical communication with the analog-to-digital converter and the input device that executes instructions to process the digital vibration data, including instructions to:

(1) generate a vibration spectrum based on the digital vibration data, the vibration spectrum comprising vibration amplitude values associated with frequency values;

(2) identify a plurality of vibration peaks in the vibration spectrum, each having a peak amplitude value and a peak frequency value;

(3) determine a plurality of candidate frequency values within the vibration spectrum that corresponds to harmonics of the start frequency value, wherein each candidate frequency value is within the percent accuracy value of at least one of the plurality of vibration peaks;

(4) determine a plurality of scores based on differences between the peak frequency values of the plurality of vibration peaks identified in step (2) and the candidate frequency values determined in step (3);

(5) determine the estimated rotational speed of the machine based on a candidate frequency value that is associated with one of the harmonic families having a particular score; and (6) analyze the digital vibration data using the estimated rotational speed of the machine to determine an operational characteristic of the machine.

14. The apparatus of claim 13, wherein the particular score is the largest score determined in step (4).

* * * * *